United States Patent
Adler et al.

(10) Patent No.: US 9,305,160 B2
(45) Date of Patent: Apr. 5, 2016

(54) METHOD AND SYSTEM FOR AUTOMATIC UPDATING OF RANDOMLY GENERATED USER PASSWORDS

(71) Applicant: PassedWord LLC, Monsey, NY (US)

(72) Inventors: Israel Martin Adler, Monsey, NY (US); Bangaly Kourouma, Jersey City, NJ (US)

(73) Assignee: PASSEDWORD LLC, Monsey, NY (US)

( * ) Notice: Subject to any disclaimer, the term of this patent is extended or adjusted under 35 U.S.C. 154(b) by 113 days.

(21) Appl. No.: 14/278,215

(22) Filed: May 15, 2014

(65) Prior Publication Data

US 2015/0286816 A1 Oct. 8, 2015

Related U.S. Application Data

(60) Provisional application No. 61/975,235, filed on Apr. 4, 2014.

(51) Int. Cl.
*H04L 9/00* (2006.01)
*H04L 9/32* (2006.01)
*G06F 21/45* (2013.01)
*H04L 29/06* (2006.01)

(52) U.S. Cl.
CPC .............. *G06F 21/45* (2013.01); *H04L 63/083* (2013.01)

(58) Field of Classification Search
CPC ............... H04L 9/08; H04L 9/22; H04L 9/24; H04L 63/083; H04L 63/0838; H04L 63/0846
USPC .............. 380/44, 46; 713/168, 178, 183, 184; 726/2–6; 708/250, 255
See application file for complete search history.

(56) References Cited

U.S. PATENT DOCUMENTS

| | | | | |
|---|---|---|---|---|
| 6,609,206 B1 * | 8/2003 | Veneklase | ............... | G06F 21/42 726/28 |
| 7,975,288 B2 * | 7/2011 | Viavant | .................. | G06F 21/40 705/51 |
| 8,059,814 B1 * | 11/2011 | Duane | .................. | H04L 9/0869 380/281 |
| 8,473,516 B2 * | 6/2013 | Sadler | ................. | G06F 21/6218 380/44 |

(Continued)

OTHER PUBLICATIONS

Mohammad Mannan et al., "Passwords for Both Mobile and Desktop Computers ObPwd for Firefox and Android", Login, Aug. 2012, pp. 28-37, vol. 37, No. 4.
Cadrain Chan et al., "E-ZeePass: A web-based username and password hash", http://www.cse.wustl.edu/~jain/cse571-09/ftp/ezpass/Index.html, Apr. 19, 2009, pp. 1-11.

(Continued)

*Primary Examiner* — Hosuk Song
(74) *Attorney, Agent, or Firm* — Buchanan Ingersoll & Rooney PC

(57) ABSTRACT

A method for generating passwords at customized internals includes: storing a plurality of user profiles, each profile including data related to a user including a plurality of account data entries, each entry including a current password, password criteria, and a predetermined period of time set by the related user; identifying at least one user profile including one or more account data entries where the included predetermined period of time has expired; generating a new password for each of the one or more account data entries included in each of the at least one user profile using random password generation algorithms, each password being based on password criteria included in the respective account data entry; and updating the current password included in each of the one or more account data entries included in each of the at least one user profile based on the generated new password.

14 Claims, 8 Drawing Sheets

(56) References Cited

U.S. PATENT DOCUMENTS

| | | | |
|---|---|---|---|
| 8,473,516 B2* | 6/2013 | Sadler | G06F 21/6218 380/44 |
| 8,607,330 B2 | 12/2013 | Childress et al. | |
| 8,752,146 B1* | 6/2014 | van Dijk | H04L 63/0861 340/5.52 |
| 2010/0325687 A1 | 12/2010 | Iverson et al. | |
| 2013/0263250 A1 | 10/2013 | Leckey et al. | |

OTHER PUBLICATIONS

Daniel McCarney, "Password Managers: Comparative Evaluation, Design, Implementation and Empirical Analysis", Aug. 26, 2013, 124 pages.

Sandeep Kale, "Top 6 Password Management Software", http://www.trickswindow.com/software/top-password-management-tools-2012/, Apr. 16, 2014, pp. 1-4.

* cited by examiner

METHOD AND SYSTEM FOR AUTOMATIC UPDATING OF RANDOMLY GENERATED USER PASSWORDS

FIELD

The present disclosure relates to the random generation of user passwords at customized intervals and sharing thereof to an additional user, specifically the ability for a user to set customized intervals on a per-password basis in a password manager for the generation of random passwords at the intervals, and the automatic sharing of the random passwords to other users upon generation.

BACKGROUND

As people begin to use computing devices, such as computers, smart phones, etc., more and more, application programs and websites continue to be developed to offer people valuable services. As a common form of authentication, many websites and applications require users to register and login with a password. With users registering and using a large number of websites and applications, such as social networks, e-mail services, merchants, message boards, games, file sharing utilities, etc., the number of passwords that a user has to remember can be overwhelming.

While some users may elect to use the same password across a variety of services, many services have different requirements for a password that make this difficult, if not impossible. In addition, the use of a single password across multiple services can post a security risk, as the user's password being compromised for one service could thereby compromise the user's account across a multitude of other services. As a result, several password management services have become available, whereby a user can register each one of his or her accounts with the password management service, which can manage the user's passwords with the corresponding provider.

Password managers can sometimes provide the user with useful additional features, such as the generating of random passwords for use with these services. The password manager can generate a random password and provide it to the corresponding service, and can automatically log in the user such that the user does not need to know or remember the random password, as long as the user can maintain access to the password manager. Some password managers may even offer the ability to generate and update passwords on a regular basis.

However, in many cases, password managers update passwords on a specific schedule set by the service itself or an administrator thereof. Because the user does not have access to the schedule for the automatic generating and updating of passwords, such password managers may often not be suitable for the needs of a user. Furthermore, such managers often change every one of a user's passwords when the schedule dictates, which again may be detrimental to the needs and wants of a user. For example, the user may have one account that is highly secure that needs the password changed at least once a day, and another account that is in less danger of being compromised that the user does not want changed more than once a week for convenience.

Thus, there is a need for a technical solution to provide a password management service to a user that can generate random passwords that fit criteria provided by the user, that are randomly generated and updated at customized intervals set by the user on a per-service basis.

SUMMARY

The present disclosure provides a description of systems and methods for the sharing of randomly generated passwords and the generation thereof at customized intervals.

A method for randomly generating passwords at customized internals includes: storing, in a profile database of a computing device, a plurality of user profiles, wherein each user profile includes data related to a user including at least a user identifier, a master password, and a plurality of account data entries, each account data entry including data related to a user account associated with the related user including at least a current password, one or more password criteria, and a predetermined period of time, wherein the predetermined period of time is set by the related user; identifying, in the profile database of the computing device, at least one user profile including one or more account data entries where the included predetermined period of time has expired; generating, by a processor of the computing device, a new password for each of the one or more account data entries included in each of the identified at least one user profile using one or more random password generation algorithms, wherein each generated new password is based on the one or more password criteria included in the respective account data entry; and updating, in the profile database of the computing device, the current password included in each of the one or more account data entries included in each of the identified at least one user profile based on the generated new password.

A method for automatically sharing randomly generated passwords includes: storing, in a profile database of a computing device, a plurality of user profiles, wherein each user profile includes data related to a user including at least a user identifier, a master password, a first method of communication associated with the related user, and a plurality of account data entries, each account data entry including data related to a user account associated with the related user including at least a current password, one or more password criteria, and a sharing method of communication associated with a different user; identifying, in the profile database, a specific user profile; generating, by a processor of the computing device, a new password for at least one account data entry included in the specific user profile using one or more random password generation algorithms, wherein each generated new password is based on the one or more password criteria included in the respective account data entry; updating, in the profile database of the computing device, the current password included in each of the at least one account data entries included in the specific user profile based on the generated new password; and transmitting, by a transmitter of the computing device, the generated new password based on the sharing method of the communication to the associated different user for each of the at least one account data entry included in the specific user profile.

A system for randomly generating passwords at customized internals includes a profile database and a processing device. The profile database is configured to store a plurality of user profiles, wherein each user profile includes data related to a user including at least a user identifier, a master password, and a plurality of account data entries, each account data entry including data related to a user account associated with the related user including at least a current password, one or more password criteria, and a predetermined period of time, wherein the predetermined period of time is set by the related user. The processing device is configured to: identify, in the profile database of the computing device, at least one user profile including one or more account data entries where the included predetermined period of time has expired; generate a new password for each of the one or more account data entries included in each of the identified at least one user profile using one or more random password generation algorithms, wherein each generated new password is based on the one or more password criteria included in the respective account data entry; and update, in the profile database of the computing device, the current password included in each of the one or more account data entries included in each of the identified at least one user profile based on the generated new password.

A system for automatically sharing randomly generated passwords includes a profile database, a processing device, and a transmitting device. The profile database is configured to store a plurality of user profiles, wherein each user profile includes data related to a user including at least a user identifier, a master password, a first method of communication associated with the related user, and a plurality of account data entries, each account data entry including data related to a user account associated with the related user including at least a current password, one or more password criteria, and a sharing method of communication associated with a different user. The processing device is configured to: identify, in the profile database, a specific user profile; generate a new password for at least one account data entry included in the specific user profile using one or more random password generation algorithms, wherein each generated new password is based on the one or more password criteria included in the respective account data entry; and update, in the profile database, the current password included in each of the at least one account data entries included in the specific user profile based on the generated new password. The transmitting device is configured to transmit the generated new password based on the sharing method of the communication to the associated different user for each of the at least one account data entry included in the specific user profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
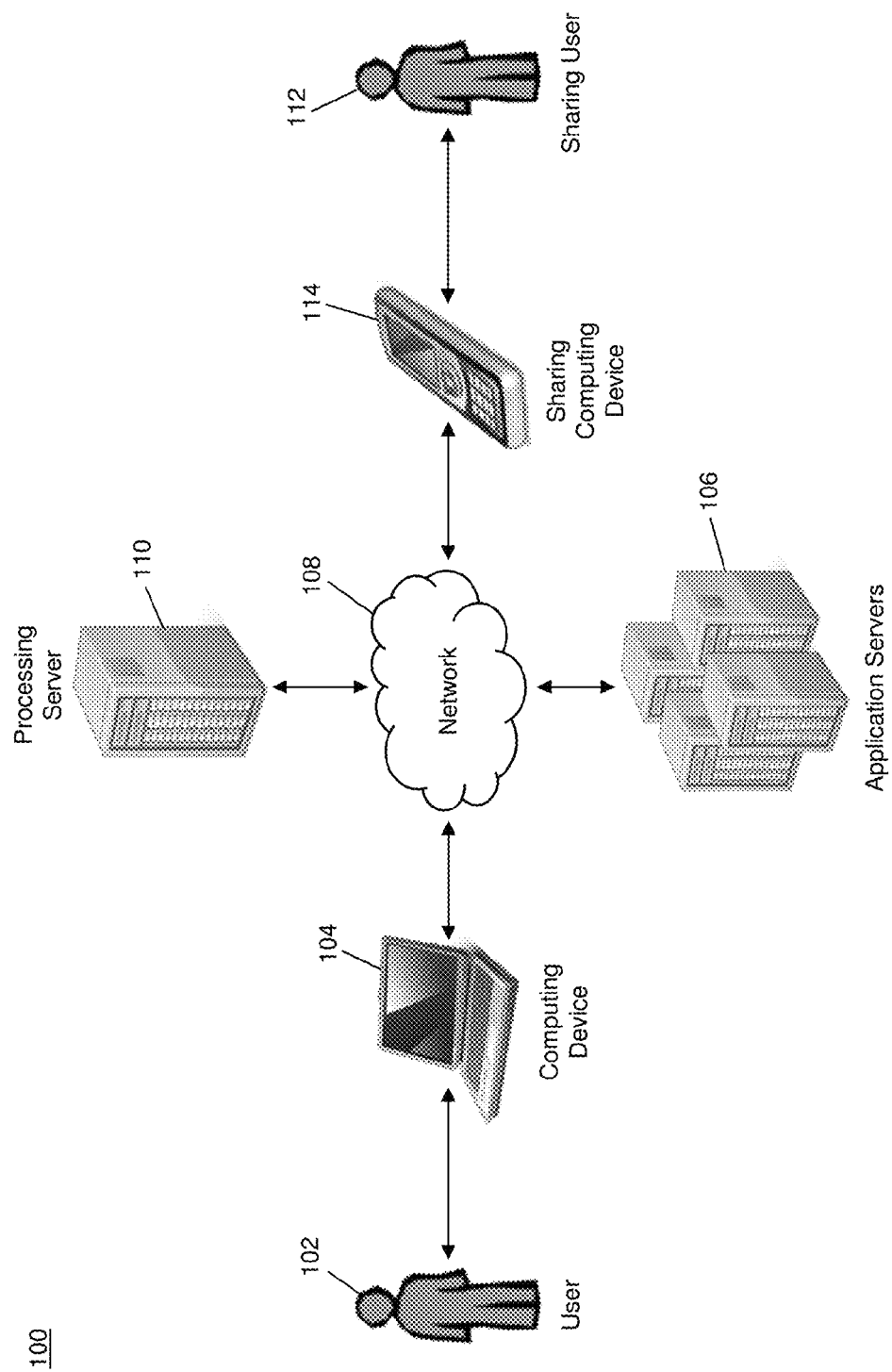
FIG. 1 is a high level architecture illustrating a system for the generation of random passwords at customized intervals and sharing thereof in accordance with exemplary embodiments.

System for Generating Random Passwords at Customized Intervals and Sharing Thereof FIG. 1 illustrates a system 100 for the generation of random passwords at user-provided custom intervals and the sharing of randomly generated passwords to additional users.

The system 100 may include a user 102. The user 102 may possess a computing device 104 that the user 102 may use to access a variety of websites, application programs, and other services that may require authentication of the user 102 via a password. The computing device 104 may be any type of computing device suitable for performing the functions disclosed herein, such as a desktop computer, laptop computer, notebook computer, tablet computer, cellular phone, smart phone, personal digital assistant, smart watch, etc.

Services to which the user 102 is registered may be managed by one or more application servers 106. Each application server 106 may store data associated with the user 102 and their account, such as a username and password associated with the user 102 and used for authentication of the user 102. When the user 102 executes a corresponding application program or visits a corresponding website, the computing device 104 may provide (e.g., upon input by the user 102 or from storage in the computing device 104) the user's 102 credentials (e.g., username and password) to the corresponding application server 106. The application server 106 may check the credentials to authenticate the user 102, and may proceed accordingly based on the authentication as will be apparent to persons having skill in the relevant art.

The computing device 104 and application servers 106 may communicate via one or more networks 108. The network 108 may be any type of network suitable for performing the functions disclosed herein, such as the Internet, a mobile communication network, a local area network, a wireless area network, a radio communication network, etc.

As the number of websites and application programs the user 102 may be registered with increases, the number of passwords the user 102 may be required to remember may become overwhelming. As a result, the user 102 may register with a password manager. The system 100 may include a processing server 110. The processing server 110, as discussed in more detail below, may be configured to manage passwords for the user 102 for a variety of accounts managed by the application servers 106. Basic functions provided by the processing server 110 for managing passwords may include storage of account credentials, the updating of account credentials at the request of the user 102, communication of updated account credentials to the corresponding application server 106, and more, as will be apparent to persons having skill in the relevant art.

For additional security for the user's 102 accounts, the processing server 110 may be further configured to randomly generate new passwords for websites or other services at customized intervals set by the user 102. As discussed in more detail below, the user 102 may set (e.g., via the computing device 104 communicating over the network 108) a customized interval for the generation of a new password for each account or service managed by the processing server 110. For example, the user 102 may set for the generating and updating of a password every six hours for a first account, once a day for a second account, and once a week for a third account. By enabling the user 102 to provide for customized intervals that are customized to each account or service, the processing server 110 may provide both additional security and additional convenience over traditional password managers.

As discussed in more detail below, the processing server 110 may store the customized intervals in a profile associated with the user 102. When the time corresponding to each interval has passed, the processing server 110 may generate a new random password based on one or more criteria (e.g., provided by the user 102 and/or the corresponding application server 106, such as password requirements set by the website or program), update the user profile with the new password for the corresponding account, and update the password with the corresponding application server 106. Methods suitable for the updating of passwords with an application server 106 by an external processing server may include the use of an application programming interface or other methods that will be apparent to persons having skill in the relevant art.

In some embodiments, the processing server 110 may be configured to notify the user 102 when a new password has been randomly generated and updated with the corresponding application server 106. For example, the processing server 110 may transmit a notification to the computing device 104 for presentation to the user 102. The notification may be an e-mail, via a message in an application program or website (e.g., used to manage the user account with the processing server 110), a short message service (SMS) message, a multimedia message service (MMS) message, a telephone call, or other suitable method of notification.

The processing server 110 may also be configured to enable the user 102 to provide for the sharing of a password with an additional user, such as a sharing user 112. In such an instance, the user 102 may share an account with a website or service with the sharing user 112. For example, the user 102 and sharing user 112 may be friends or acquaintances, both of whom share a single account to a media streaming service or online merchant. As discussed in more detail below, the user 102 may provide the processing server 110 with information regarding the sharing of newly generated passwords, such as providing a method of communication to a sharing computing device 114. The sharing computing device 114 may be a computing device associated with the sharing user 112, such as a desktop computer, laptop computer, notebook computer, tablet computer, cellular phone, smart phone, personal digital assistant, smart watch, etc. In some embodiments, the user 102 may set a different sharing computing device 114 for sharing of a password on a per-password or per-service basis. In some instances, if the sharing user 112 also uses the password management service provided by the processing server 110, the user 102 may select to share newly generated passwords with the sharing user 112 via the password management service (e.g., accessible by the sharing user 112 via the sharing computing device 114 while accessing their account with the processing server 110).

When the processing server 110 generates a new password (e.g., at the customized interval set by the user 102), the processing server 110 may also generate a transmit a message including the new password to the sharing computing device 114 associated with the sharing user 112. The message including the new password may be transmitted by e-mail, via a message in an application program or website, a short message service (SMS) message, a multimedia message service (MMS) message, a telephone call, or other suitable method. In some instances, the user 102 may request a password be shared one time (e.g., at the time of submitting the request), or may request a password be shared automatically upon updating by the processing server 110. The sharing of passwords to a sharing user 112 upon generation by the processing server 110 may provide for added convenience to both the user 102 and the sharing user 112 over traditional password managers, as the convenience in the traditional sharing of an account may be maintained, while receiving the added benefits and security of a password manager, particularly a password manager provided by the processing server 110 discussed herein.

The processing server 110 may also be configured to provide additional features to the user 102 and/or computing device 104 for the management and use of randomly generated passwords. For example, in one embodiment, the processing server 110 may enable the user 102 to automatically login to a website or application program with a newly generated password. In such an embodiment, an application program or website operated by the processing server 110 (e.g., and accessed via the computing device 104) may include a hyperlink to a website or application program that, when selected by the user 102, automatically logs the user 102 in to the linked website or application program with stored credentials.

In another embodiment, the processing server 110 may be configured to enable the user 102 to view randomly generated passwords. For example, an application program or website operated by the processing server 110 may include an option for the user 102 to view a current password for each account registered with the processing server 110. In some embodiments, the user 102 may be able to set criteria for use in the generating of random passwords for updating by the processing server 110. For example, the user 102 may set a minimum or maximum number of characters to be included in a password, a minimum number of different types of characters (e.g., letters, numbers, symbols), rules regarding the use of uppercase or lowercase characters, etc.

In some embodiments, accounts registered with the processing server 110 by the user 102 may use multiple methods of communication to manage the account. For example, the user 102 may be required to register and login with the processing server 110 using a master password or other similar credential as well as an additional credential, such as a one-time password or value provided by a security token. For instance, the user 102 may have a second computing device, such as a smart phone, that has an application program stored therein that is configured to provide a one-time password. In such an instance, the user 102 may provide their master password for their account via the computing device 104, as well as the one-time password provided by the application program on the smart phone. The processing server 110 may then authenticate the user 102 using both items. Methods for authentication of a user using multiple points of authentication, and the use of security tokens, one-time passwords, or other suitable types of authentication, will be apparent to persons having skill in the relevant art.

In one embodiment, the processing server 110 may be configured to automatically login the user 102 in one or more computing devices 104 once a new password has been generated. For example, the processing server 110 may update a password for a user account with a website, and then may instruct the computing device 104 to login to the website or otherwise update stored data (e.g., in a browsing application program, website cookie, etc.) regarding the password to be used to login to the corresponding website. In such an instance, the user 102 may continue to browse the website without their experience being interrupted by the updating of the password.

In another embodiment, the processing server 110 may be configured to automatically update the password stored in one or more application programs in one or more computing devices 104 based on a newly generated and updated password. For example, the user 102 may have multiple computing devices, each of which may include an application program for a social network. The application program may store login credentials locally on the corresponding computing device, such that the user 102 may load the application program and be logged in to their account without having to enter credentials each time. In such an instance, the processing server 110 may instruct each computing device to update the locally stored login credentials with the updated password, such that the user experience is not interrupted.

Processing Server

Figure 2:
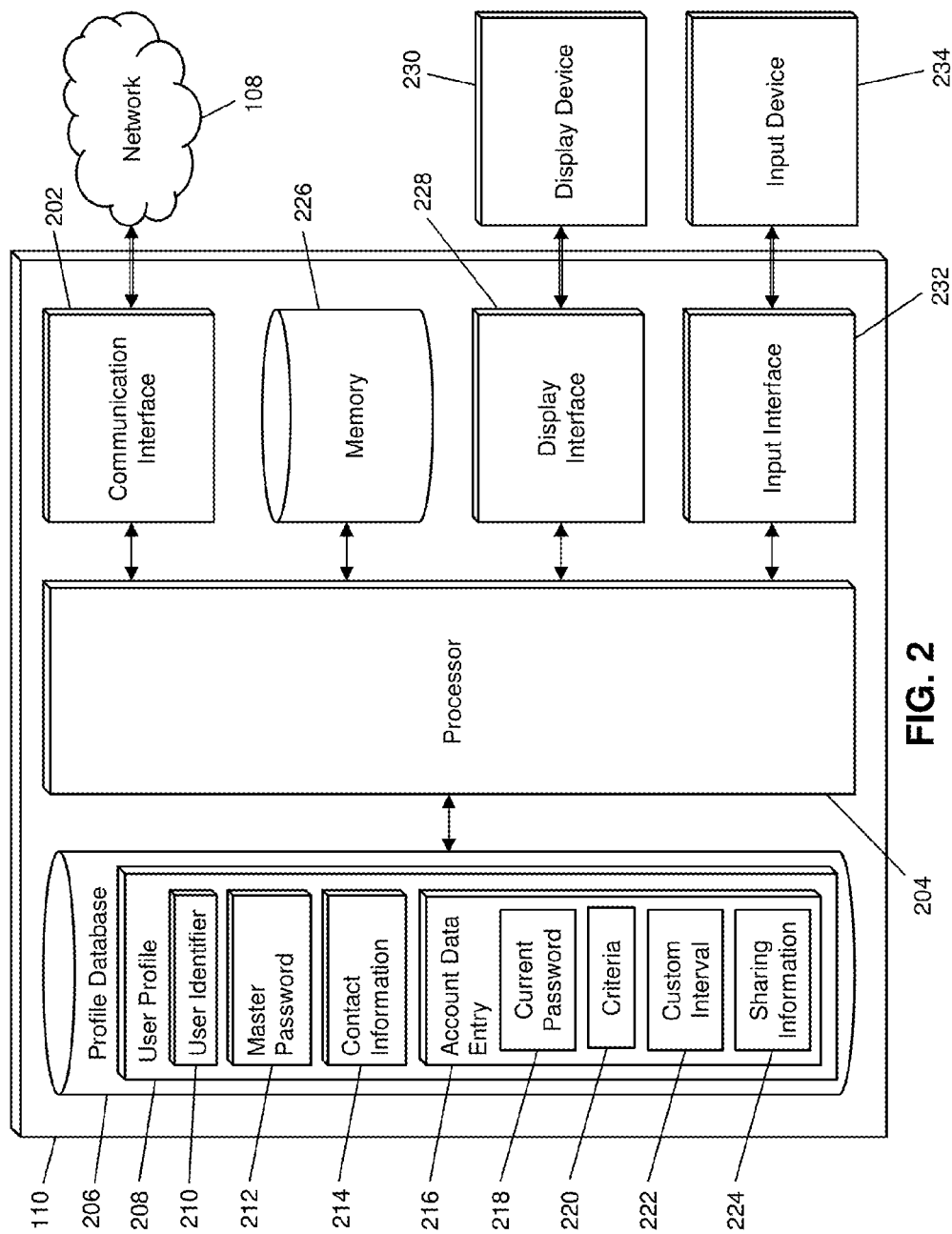
FIG. 2 is a block diagram illustrating the processing server of FIG. 1 for the generation of random passwords at customized intervals and sharing thereof in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 102 suitable for performing the functions as discussed herein.

The processing server 110 may include a communication interface 202. The communication interface 202 may be configured to transmit and receive data over one or more networks via one or more network protocols. The communication interface 202 may receive and transmit data over the network 108, such as to and from the computing device 104, application servers 106, and sharing computing device 114. For example, the communication interface 202 may receive account registration data over the network 108 from the user 102 via the computing device 104.

The processing server 110 may further include a processor 204. The processor 204 may be configured to perform the functions of the processing server 110 as discussed herein and as will be apparent to persons having skill in the relevant art. When the user 102 registers with the processing server 110, the processor 204 may be configured to store registration data and other data associated with the user 102 in a profile database 206. The user data may be stored in a user profile 208 associated with the user 102 and included in the profile database 206.

Each user profile 208 may include data associated with a user 102 and include a user identifier 210, master password 212, contact information 214, and one or more account data entries 216. The user identifier 210 may be a unique value suitable for identification of the user 102 and/or their corresponding user profile 208, such as an identification number, username, e-mail address, phone number, etc. In some embodiments, each user profile 208 may include multiple user identifiers 210, such as both a user identification number and a username.

The master password 212 may be a password provided by the user 102 for management of their account with the processing server 110. The contact information 214 may include information for use by the processing server 110 in contacting the user 102, such as a preferred method of contact (e.g., e-mail, SMS message, MMS message, website, etc.), identifier for use in the preferred method of contact (e.g., e-mail address, telephone number, device identifier, internet protocol address, media access control address, etc.), etc. In some embodiments, the contact information 214 (e.g., or the user profile 208 as a whole) may include data regarding the computing device 104 associated with the user 102 or another computing device used by the user 102 for authentication of the user, such as a computing device on which a security token application program is installed or an identifier of the security token application program.

Each of the one or more account data entries 216 may include data related to a website, application program, or service account associated with the user 102 and managed by the processing server 110. Each account data entry 216 may include at least a current password 218, one or more password criteria 220, a custom interval 222, and, if applicable, sharing information 224. Each account data entry 216 may also include additional credentials associated with the corresponding service (e.g., username, e-mail address, etc.), information regarding automatic login of the corresponding account (e.g., addresses or other data regarding application programs and websites on one or more computing devices to be updated with a new password), or other additional data as will be apparent to persons having skill in the relevant art.

The current password 218 may be the password that is currently used for login to the associated account or service. The one or more password criteria 220 may be criteria provided by the user 102 and/or the corresponding service for the generation of a new random password to be used to update the current password 218 on the account. For example, the one or more password criteria 220 may include a minimum or maximum number of characters to be included in a password, a minimum number of different types of characters (e.g., letters, numbers, symbols), rules regarding the use of uppercase or lowercase characters, etc.

The custom interval 222 may be a predetermined period of time set by the user 102 related to the corresponding user profile 208 for the updating of the current password 218 in the account related to the respective account data entry 216. The predetermined period of time may be any period of time suitable for performing the functions disclosed herein, such as 5 minutes, 30 minutes, 1 hour, 2 hours, 6 hours, 12 hours, 24 hours, 2 days, 1 week, 1 month, 6 months, 1 year, never, etc. The custom interval 222 may be specific to the respective account data entry 216, such that the user 102 may set an individual custom interval 222 for each account data entry 216. For example, the user 102 may set one or more accounts to update once an hour, and may set other accounts to update once a day.

The sharing information 224 may include contact information regarding the sharing of the current password 218 for the account data entry 216 once the password is updated (e.g., based on the custom interval 222). The sharing information may include a method of contact for the sharing user 112 and contact information regarding sharing the current password 218 via the method of contact. For example, a newly generated password may be transmitted to a specific sharing computing device 114 (e.g., via an internet protocol address, media access control address, telephone number, e-mail address, device identifier, etc.) via a specified method, such as e-mail, telephone, SMS message, MMS message, etc.

As discussed in more detail below, the processor 204 may be configured to generate random passwords for each account data entry 216 based on the included one or more password criteria 220. In some embodiments, the processor 204 may generate a random password for an account data entry 216 and update the current password 218 included in the account data entry 216 if the predetermined period of time set in the included custom interval 222 has expired. In such an embodiment, the processor 204 may be configured to monitor the custom interval 222 for each account data entry 216 in each user profile 208 and generate a new password and update the current password 218 accordingly. In some instances, each account data entry 216 may include a time when the current password 218 was set (e.g., for comparison with the custom interval 222). In other instances, the custom interval 222 may be a countdown to when a new password needs to be generated, or may be a time at which the processor 204 is to generate a new password.

When a new password is generated and the current password 218 in the corresponding account data entry 216 updated, the processor 204 may be configured to generate and/or execute instructions for updating the account with the corresponding application server 106 based on the updated password. The communication interface 202 may transmit any corresponding data and/or instructions to the respective application server 106 over the network 108. In some embodiments, the processor 204 may also generate data and/or instructions for transmitting to one or more computing devices 104 associated with the respective user profile 208 by the communication interface 202 for updating of the password data stored therein, as discussed herein.

The processor 204 may also be configured to generate a notification based on an updated password. The notification may be for transmitting to the computing device 104 associated with the user 102 related to a respective user profile 208 (e.g., based on the included contact information 214) and/or for transmitting to the sharing computing device 114 associated with the sharing user 112 (e.g., based on the sharing information 224 in the respective account data entry 216). In some instances, the notification may include the newly generated password. The notification may be transmitted via the communication interface 202 over the network 108 to the corresponding destination.

The processing server 110 may also include a memory 226. The memory 226 may be configured to store data suitable for performing the functions disclosed herein. In some embodiments, the processing server 110 may also include a display interface 228. The display interface 228 may be configured to interface the processing server 110 with one or more display devices 230, such as to view data stored in the memory 226 or profile database 206 of the processing server 110. The processing server 110 may also include an input interface 232. The input interface may be configured to interface the processing server 110 with one or more input devices 234, such as to receive data input by one or more users of the processing server 110. Additional or alternative components that may be included in the processing server 110, or additional functions provided by the components illustrated in the processing server 110 and discussed herein (e.g., for the traditional features of a password management service) will be apparent to persons having skill in the relevant art.

Process for Sharing and Generation of Passwords at Custom Intervals

Figure 3:
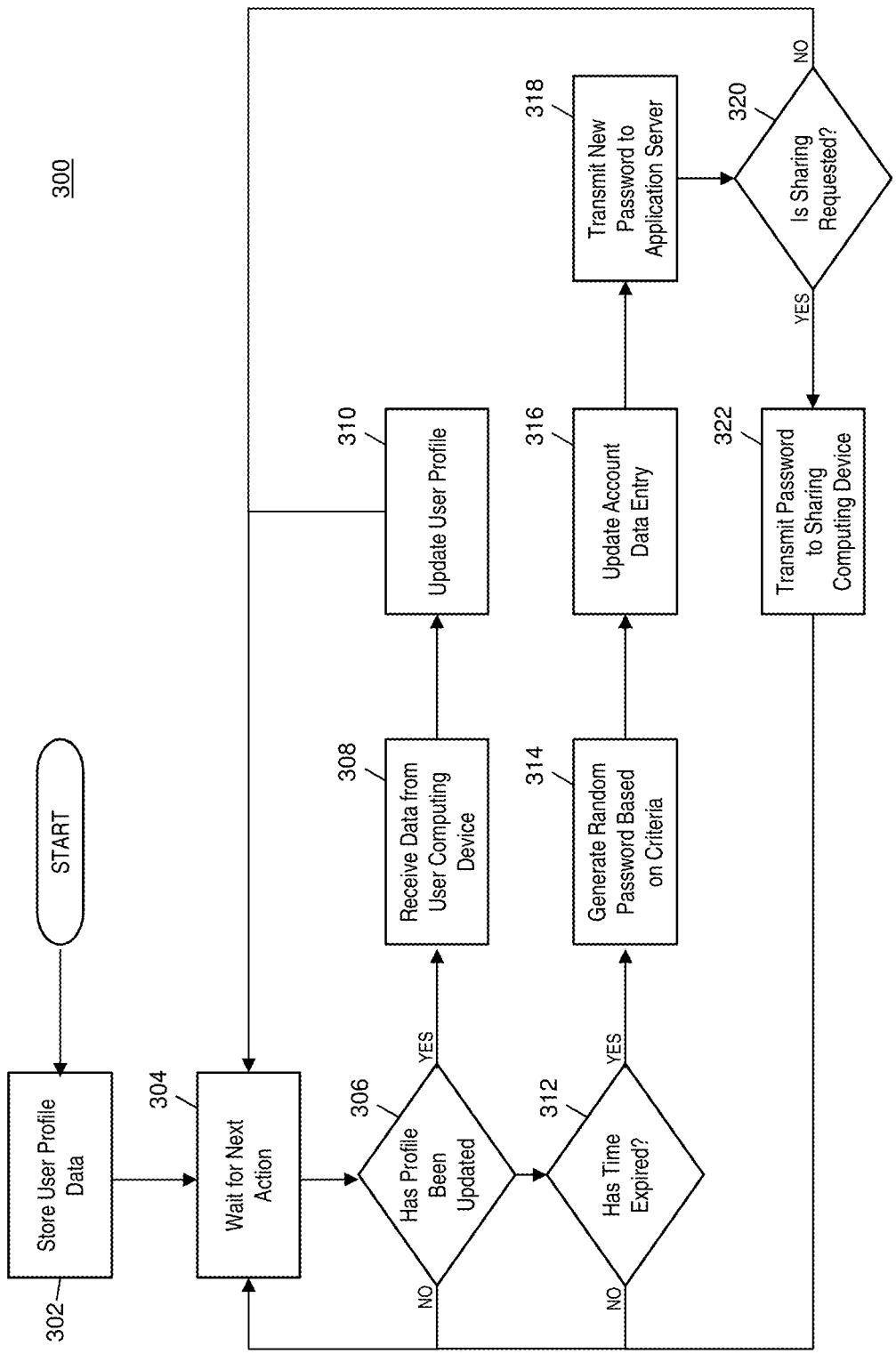
FIG. 3 is a flow diagram illustrating a process for generating random passwords at customized intervals and sharing thereof using the processing server of FIG. 2 in accordance with exemplary embodiments.

FIG. 3 illustrates a process 300 for the generation of random passwords at user-provided custom intervals and the sharing thereof to an additional user.

In step 302, the processor 204 of the processing server 102 may store user profile data as a user profile 208 in the profile database 206 of the processing server 102. In step 304, the processor 204 may wait and monitor for the next action to occur. Once an action has occurred (e.g., been detected by the processor 204 or other component of the processing server 110), the process 300 may continue and the processor 204 may determine the action that has occurred.

In step 306, the processor 204 may determine if the user profile 208 has been updated. The determination may be based on, for example, if data has been received by the communication interface 202 over the network 108 from a computing device 104. If the user profile 208 has been updated by the user 102, then, in step 308, the communication interface 202 may receive the data from the computing device 104 and forward the received update data to the processor 204. The update data may include at least a user identifier 210 associated with the user 102, and the data for updating in the user profile 208.

In step 310, the processor 204 may update the user profile 208 based on the received update data. Updating the user profile 208 may include identifying the user profile 208 in the profile database 206 that includes a user identifier 210 corresponding to the identifier received from the computing device 104, and updating the corresponding data. Updating the corresponding data may include updating the contact information 214, updating the master password 212, associating a new computing device 104 with the user profile 208, adding a new account data entry 216 corresponding with a new service being registered with the user profile 208, updating a custom interval 222, sharing information 224, or criteria 220 in a specified account data entry 216, etc. Once the user profile 208 has been updated, the process 300 may return to step 304, where the processor 204 may wait for additional actions.

If an action has occurred that is not the updating of a user profile 208, then, in step 312, the processor 204 may determine if a custom interval 222 in one or more account data entries 216 of one or more user profiles 208 has expired. The expiration of a custom interval 222 may be identified by a custom interval 222 counting down to zero, a current time and/or date exceeding a time and/or date set in the custom interval 222, a predetermined period of time in a custom interval 222 having passed since a timestamp for a previous password change, or other suitable method. If no custom interval 222 has expired, then the process 300 may return to step 304 and the processing server 110 may await a new action.

If a custom interval 222 has expired, then, in step 314, the processor 204 may generate a random password for each account data entry 216 in each user profile 208 where the included custom interval 222 has expired. The random password generated for each account data entry 216 may be based on the criteria 220 included in the respective account data entry 216. In step 316, the processor 204 may update the respective account data entry by updating the current password 218 with the newly generated random password. In some embodiments, the account data entry 216 may continue to store the old password, such as in instances where the old password may be used to update the password with the application server 106. In some instances, the old password may be stored in the memory 226 of the processing server 110.

In step 318, the communication interface 202 of the processing server 110 may transmit the newly generated password to the corresponding application server 106 for updating of the password in the associated account. In some embodiments, the communication interface 202 may also transmit any other data necessary for use in updating the password, such as other user credentials (e.g., username, e-mail address, etc.), the previous password, etc. Methods and systems for providing a new password to an application server 106 for updating thereof will be apparent to persons having skill in the relevant art.

In step 320, the processor 204 may determine if the newly generated password is to be shared with one or more sharing users 112. The determination may be based on data included in the respective account data entry 216, such as the sharing information 224. If the new password is not to be shared, then the process 300 may return to step 304 where the processing server 110 may await a new action. If the password is to be shared, then, in step 322, the communication interface 202 may transmit a notification including the newly generated password to one or more sharing computing devices 114, based on the sharing information 224 included in the account data entry 216. Once sharing is completed, the process 300 may return to step 304, and the processing server 110 may await a new action.

Graphical User Interface

Figure 4A:
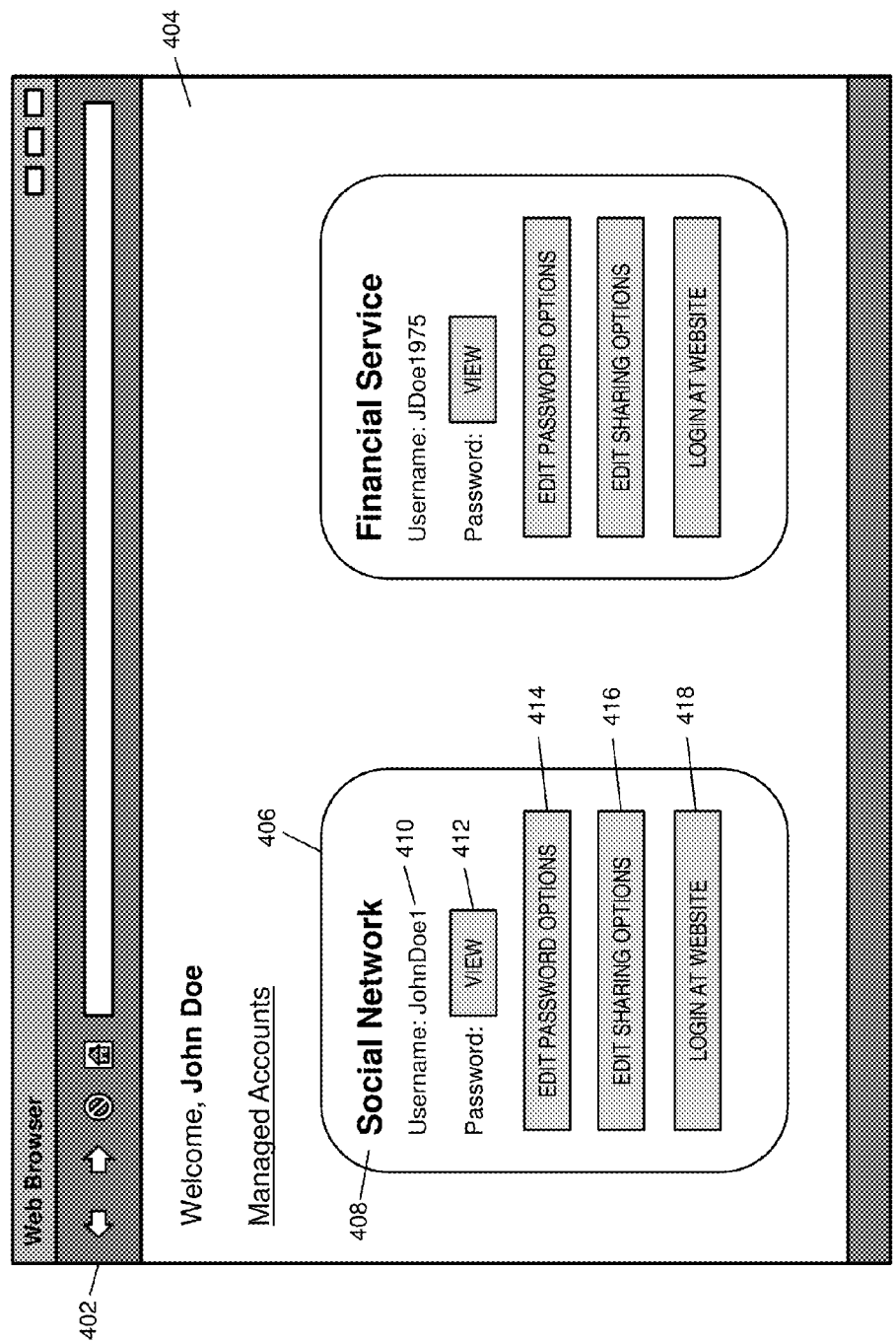
FIGS. 4A-4C are illustrations of graphical user interfaces for the management of customized intervals for the generating of random passwords and configurations for the sharing of generated passwords in accordance with exemplary embodiments.
Figure 4B:
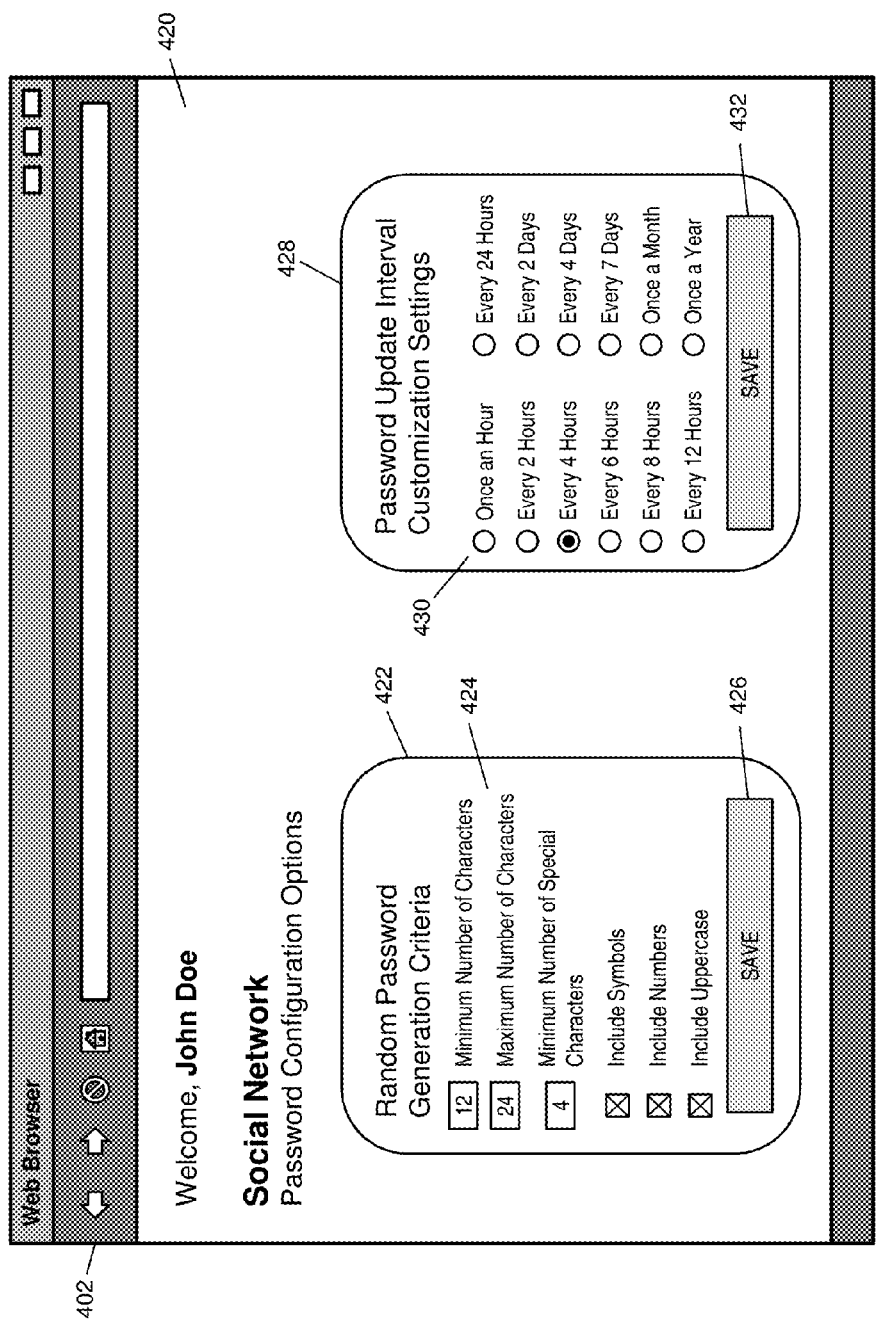
Figure 4C:
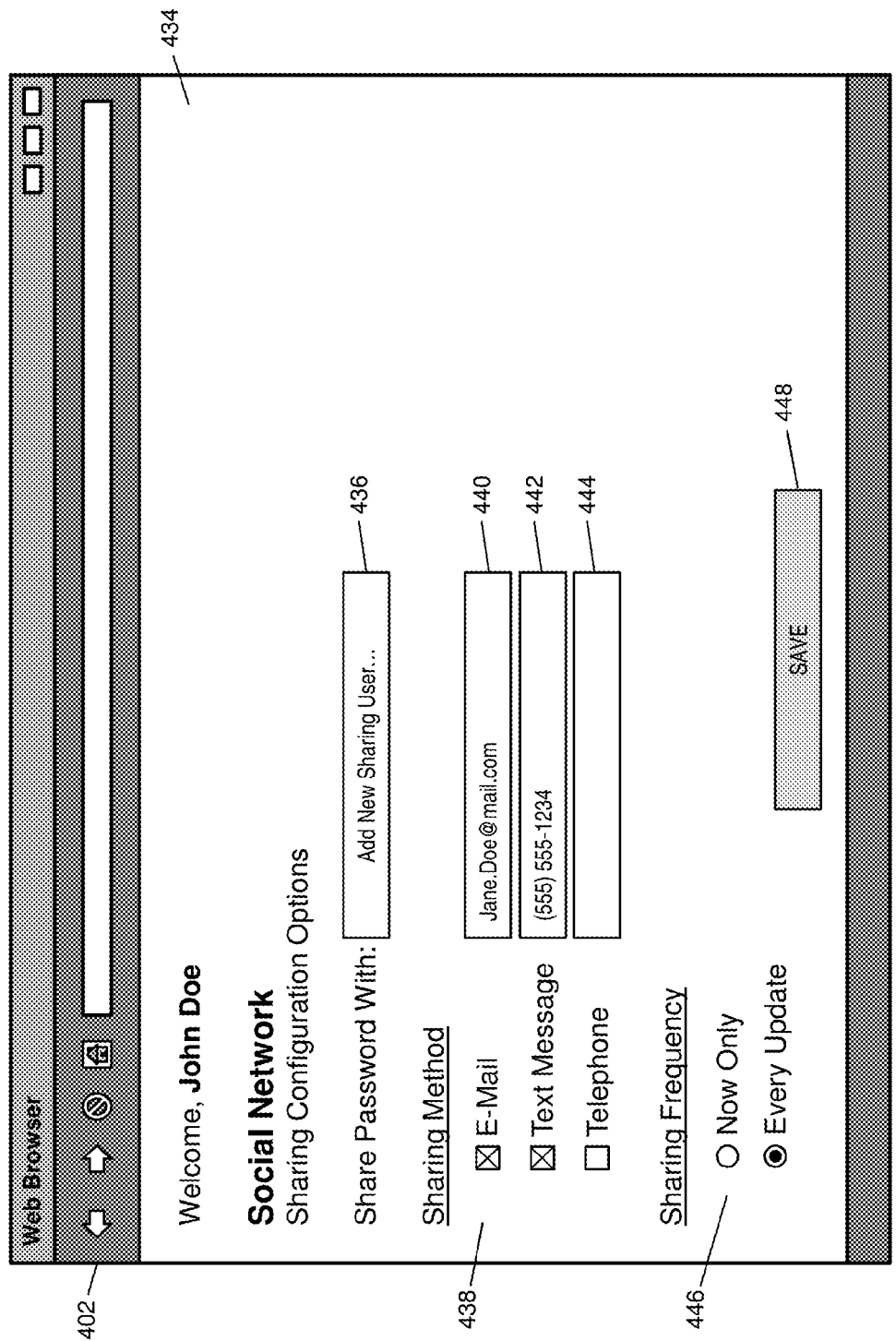

FIGS. 4A-4C each illustrate exemplary graphical user interfaces of a website to be visited by or an application program to be executed by the computing device 104 for management of an account (e.g., user profile 208) by the user 102 with the processing server 110. It will be apparent to persons having skill in the relevant art that the interfaces illustrated in FIGS. 4A-4C and discussed herein are presented as illustrations only, and that additional or alternative configurations may be suitable for performing the functions disclosed herein.

FIG. 4A illustrates a web browser 402, which may be a web browsing application program or a web browser executed as part of another application program in the computing device 104. The web browser 402 may display an account management page 404. The account management page 404 may include one or more managed accounts 406. Each managed account 406 may correspond to an account data entry 216 stored in the user profile 208 corresponding to the user 102 browsing the account management page 404. In the example illustrated in FIG. 4A, the user 102, John Doe, has two accounts whose passwords are being managed by the processing server 110, a first account with Social Network, and a second account with Financial Service.

Each managed account 406 may include data and actions corresponding to the respective account data entry 216. In the illustrated example, the managed account 406 may include a service name 408. The service name 408 may correspond to the service with which the managed account 406 corresponds, such as for identification of the service by the user 102. The managed account 406 may also include a view password button 412. The view password button 412 may show (e.g., in the current page 404 or in a new window or page) the current password 218 for the account data entry 216.

The managed account 406 may further include an edit password options button 414. The edit password options button 414 may present the user 102 with a new page to edit options for the password for the corresponding account data entry 216, such as the password options page 420 illustrated in FIG. 4B and discussed below. The managed account 406 may also include an edit sharing options button 416. When pressed by the user 102, the edit sharing options button 416 may present the user 102 with a new page to edit the options for sharing the password for the corresponding account data entry 216, such as the sharing options page 434 illustrated in FIG. 4C and discussed below.

The managed account 406 may further include a login button 418. The login button 418 may be used to log the user 102 directly into the account or service corresponding to the managed account 406. In some embodiments, the button 418 may initiate logging in (e.g., or changing of managed credentials) for the user 102 for all registered computing devices 104. In other embodiments, the button 418 may prompt the user 102 to select a computing device 104. In another embodiment, the managed account 406 may include multiple buttons, such as one for each registered computing device 104. In yet another embodiment, the button 418 may be initiate logging in of the current computing device 104 (e.g., used to access the account management page 404).

FIG. 4B illustrates a password options page 420, such as one presented to the user 102 once the edit password options button 414 has been pressed. The password options page 420 may include options for customization by the user 102 for the password for a specific account data entry 216. In some embodiments, the user 102 may be able to set the password options for every account data entry 216 in their user profile 208 at the same time using the same processes and interfaces.

The password options page 420 may include a password criteria section 422. The password criteria section 422 may include a plurality of password criteria options 424. Each password criteria option 424 may correspond to one or more criteria 220 included in, or to be included in, the account data entry 216 corresponding to the account being managed in the password options page 420. In some embodiments, the password criteria options 424 may include default and/or required options, such as options required by the corresponding service. For example, if the corresponding service requires all passwords have a minimum of eight characters, the password criteria options 424 may prohibit the user 102 from entering less than eight for the minimum number of characters field.

The password criteria section 422 may also include a save button 426. The save button 426, when interacted with by the user 102, may prompt the processor 204 to update the criteria 220 included in the respective account data entry 216 for the user's 102 user profile 208 based on the password criteria options 424.

The password options page 420 may also include a custom interval section 428. The custom interval section 428 may include one or more custom interval options 430 for selection by the user 102. Each custom interval option 430 may correspond to a custom interval that may be selected to serve as the custom interval 222 in the respective account data entry 216. While it is illustrated that the custom interval options 430 include a discrete set of preset intervals, it will be apparent to persons having skill in the relevant art that, in some embodiments, the user 102 may be able to create a specialized option (e.g., for a specified number of minutes and/or hours, such as a number or combination not illustrated).

The custom interval section 428 may also include a save button 432. When interacted with by the user 102, the save button 432 may prompt the processor 204 to update the custom interval 22 included in the respective account data entry 216 for the user's 102 user profile 208 based on the custom interval option 430 selection.

FIG. 4C illustrates a sharing options page 434, such as one presented to the user 102 once the edit sharing options button 416 has been pressed. The sharing options page 434 may include options for the sharing of a password for the respective account data entry 216 as set by the user 102 of the corresponding user profile 208.

The sharing options page 434 may include a sharing field 436. The sharing field 436 may be edited by the user 102 to select a sharing user 112 for sharing of the corresponding password. In some embodiments, the processing server 110 may be configured to store data regarding one or more sharing users 112, such as for quick selection by the user 102 for sharing using previously provided data. In the example illustrated in FIG. 4C, the user 102 may select to add a new sharing user 112 using the sharing field 436.

The sharing options page 434 may also include a plurality of sharing methods 438. The sharing methods 438 may include one or more methods by which a password may be shared to sharing users 112. As illustrated in FIG. 4C, in some embodiments, the user 102 may be able to select multiple sharing methods for sharing of a password to one or more sharing users 112. Each sharing method 438 may also include, where applicable, a corresponding data field, such as e-mail field 440, text field 442, and phone field 444. The e-mail field 440, text field 442, and phone field 444 may be filled out by the user 102 to provide destination information or other data suitable for use by the communication interface 202 in transmitting the password via the specified sharing method 438. In some instances, the sharing methods 438 may include the password management service provided by the processing server 110. In such an instance, the user 102 may select another user (e.g., the sharing user 112) of the processing server 110 via the sharing field 436. In such an instance, the sharing user 112 may receive the shared password via the processing server 110 when accessing their own account, such as by the shared password being listed on the account management page 404 (e.g., as a managed account 406, such as one for which the options for the sharing user 112 are limited).

The sharing options page 434 may also include sharing frequency options 446. The sharing frequency options 446 may include a selector, illustrated in FIG. 4C as two radio buttons, that may enable the user 102 to specify if the password is to be shared only upon execution, or if the password is to be shared with the specified sharing user or users 112 every time it is updated. The sharing options page 434 may also include a save button 448. The save button 448, when interacted with by the user 102, may prompt the processor 204 to update the sharing information 224 for the account data entry 216 and/or instruct the communication interface 202 to transmit the current password 218 for the account data entry 216 to the specified sharing user 112 (e.g., based on the sharing frequency options 446).

Exemplary Method for Randomly Generating Passwords at Customized Intervals

Figure 5:
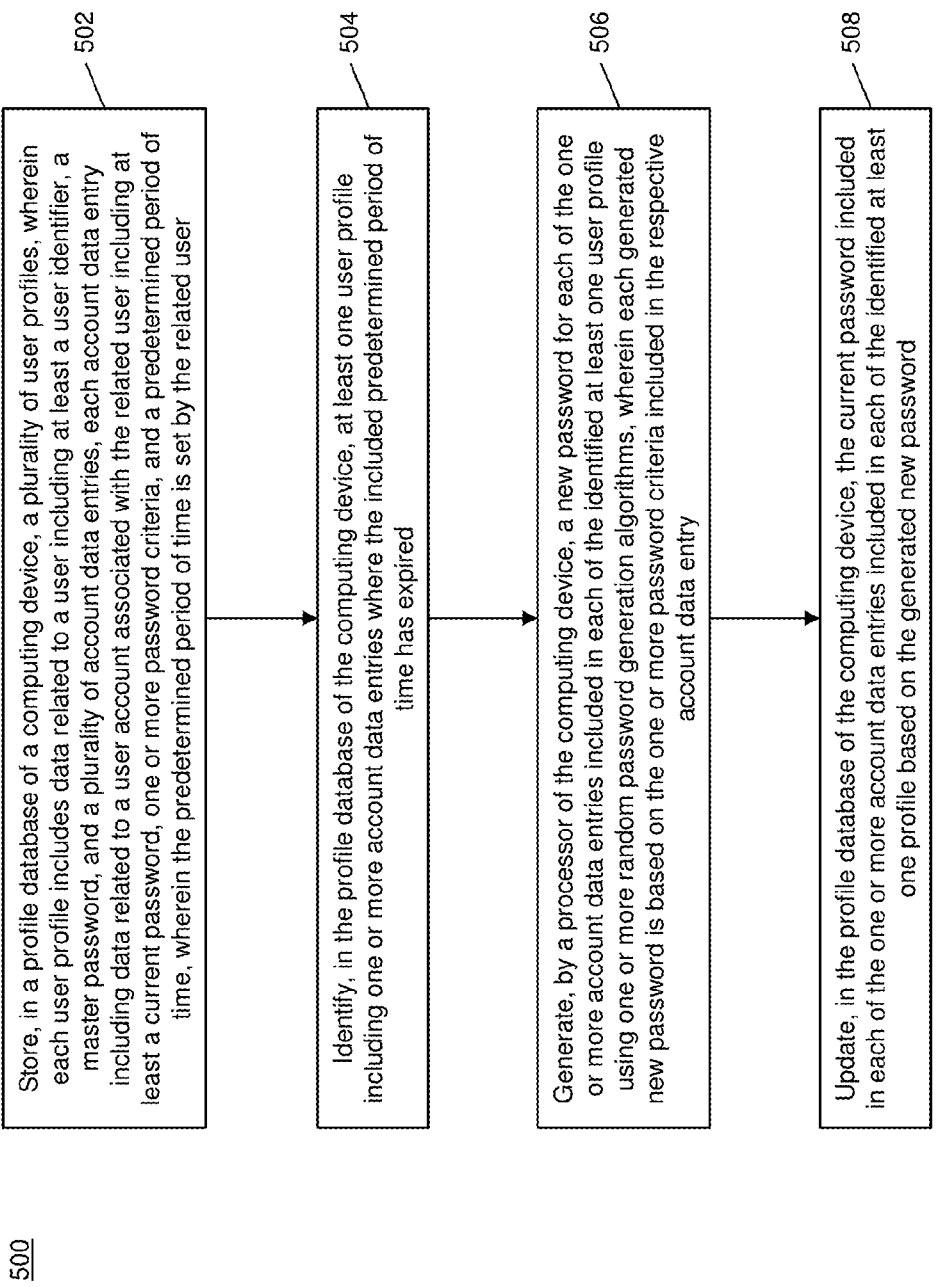
FIG. 5 is a flow chart illustrating an exemplary method for randomly generating passwords at customized intervals in accordance with exemplary embodiments.

FIG. 5 illustrates a method 500 for the generation of random passwords at customized intervals provided by the user.

In step 502, a plurality of user profiles (e.g., user profiles 208) may be stored in a profile database (e.g., the profile database 206) of a computing device (e.g., the processing server 110), wherein each user profile 208 includes data related to a user (e.g., the user 102) including at least a user identifier (e.g., user identifier 210), a master password (e.g., master password 212), and a plurality of account data entries (e.g., account data entries 216), each account data entry 216 including data related to a user account associated with the related user 102 including at least a current password (e.g., current password 218), one or more password criteria (e.g., criteria 220), and a predetermined period of time (e.g., custom interval 222), wherein the predetermined period of time 222 is set by the related user 102. In one embodiment, the one or more password criteria 220 may include at least one of: minimum number of characters, maximum number of characters, number of alphanumeric characters, number of symbols, and letter case requirements.

In step 504, at least one user profile 208 may be identified in the profile database 206 of the computing device 110 where the identified at least one user profile 208 includes one or more account data entries 216 where the included predetermined period of time 222 has expired. In step 506, a new password may be generated, by a processor (e.g., the processor 204) of the computing device 110, for each of the one or more account data entries 216 included in each of the identified at least one user profile 208 using one or more random password generation algorithms, wherein each generated new password is based on the one or more password criteria included in the respective account data entry 216.

In step 508, the current password 218 included in each of the one or more account data entries 216 included in each of the identified at least one user profile 208 may be updated, in the profile database 206 of the computing device 110, based on the generated new password. In one embodiment, each user profile 208 may further include contact information (e.g., contact information 214), and the method 500 may further include: identifying, by the processor 204 of the computing device 110, a specific user profile 208 of the identified at least one user profile 208; and transmitting, by a transmitter (e.g., the communication interface 202) of the computing device 110, at least an indication of the generated new password for each of the one or more account data entries 216 included in the specific user profile 208 where the included predetermined period of time 222 has expired to the user 102 related to the specific user profile 208 based on the contact information 214 included ni the specific user profile 208.

In some embodiments, the method 500 may also include transmitting, by the transmitter 202 of the computing device 110, the generated new password for each of the one or more account data entries 216 included in each of the identified at least one user profile 208 to an application server (e.g., the application server 106) associated with the respective related user account. In one embodiment, the method 500 may further include: receiving, by a receiver (e.g., the communication interface 202) of the computing device 110, a password interval update request originating from a specific user 102, wherein the password interval update request includes at least a specific user identifier associated with the specific user 102 and an updated period of time; identifying, in the profile database 206 of the computing device 110, a specific user profile 208 where the included user identifier 210 corresponds to the specific user identifier; and updating, in the specific user profile 208, the predetermined period of time 222 based on the updated period of time.

Exemplary Method for Automatically Sharing Randomly Generated Passwords

Figure 6:
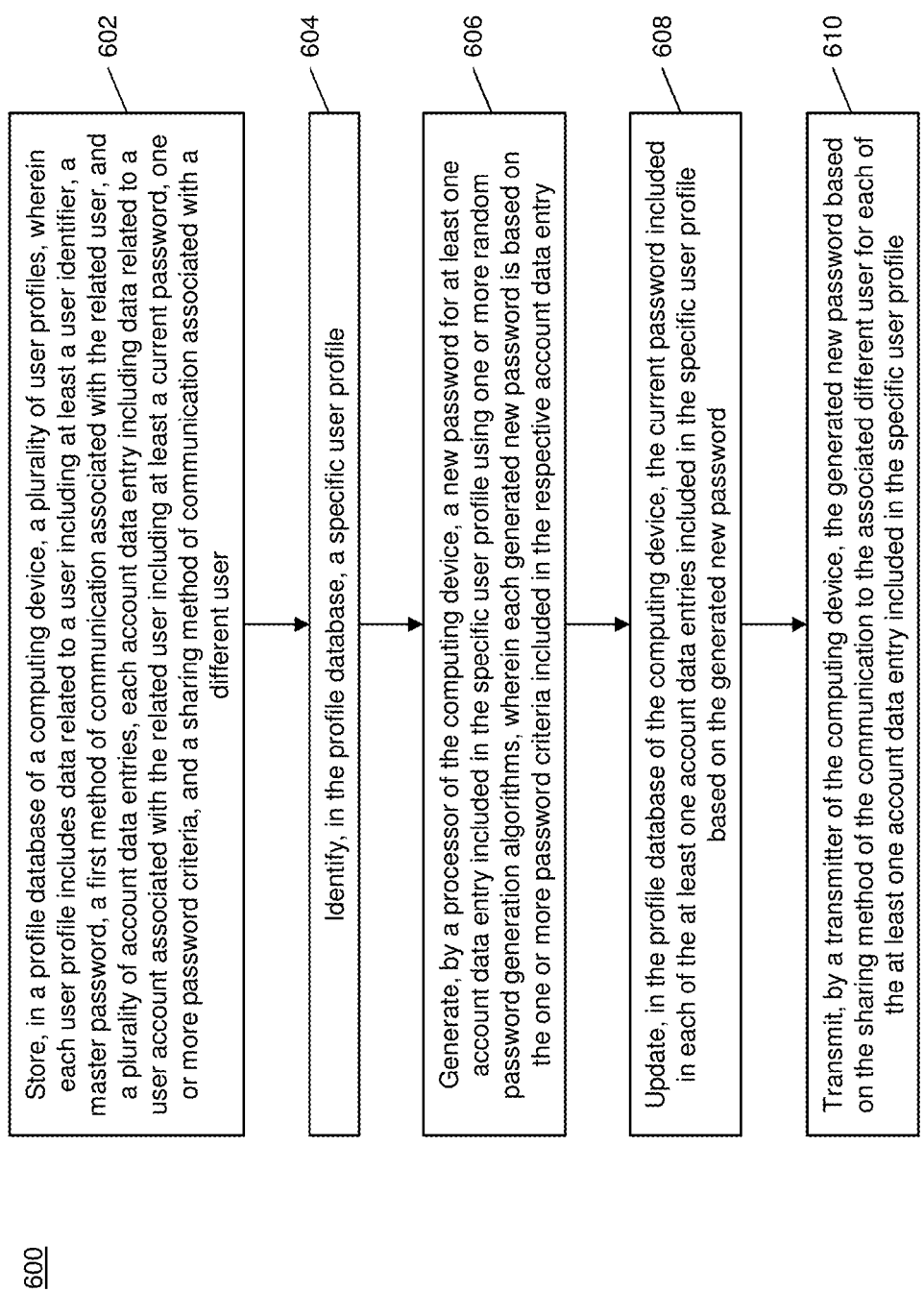
FIG. 6 is a flow chart illustrating an exemplary method for automatically sharing randomly generated passwords in accordance with exemplary embodiments.

FIG. 6 illustrates a method 600 for the automatic sharing of a password randomly generated for a user to a different user.

In step 602, a plurality of user profiles (e.g., user profiles 208) may be stored in a profile database (e.g., the profile database 206) of a computing device (e.g., the processing server 110), wherein each user profile 208 includes data related to a user (e.g., the user 102) including at least a user identifier (e.g., the user identifier 210), a master password (e.g., the master password 212), a first method of communication (e.g., contact information 214) associated with the related user 102, and a plurality of account data entries (e.g., account data entries 216), each account data entry 216 including data related to a user account associated with the related user 102 including at least a current password (e.g., current password 218), one or more password criteria (e.g., criteria 220), and a sharing method of communication (e.g., the sharing information 224) associated with a different user (e.g., the sharing user 112). In one embodiment, the sharing method of communication includes at least one of: electronic mail, short message service message, multimedia message service message, and telephone.

In step 604, a specific user profile 208 may be identified in the profile database 206. In step 606, a new password may be generated, by a processor (e.g., the processor 204) of the computing device 110, for at least one account data entry 216 included in the specific user profile 208 using one or more random password generation algorithms, wherein each generated new password is based on the one or more password criteria 220 included in the respective account data entry 216. In step 608, the current password 218 included in each of the at least one account data entries 216 included in the specific user profile 208 may be updated in the profile database 206 of the computing device 110 based on the generated new password.

In step 610, the generated new password may be transmitted by a transmitter (e.g., the communication interface 202) of the computing device 110 based on the sharing method of communication 224 to the associated different user 112 for each of the at least one account data entry 216 included in the specific user profile 208. In some embodiments, the method 600 may further include transmitting, by the transmitter 202 of the computing device 110, the generated new password based on the first method of communication 214 to the related user 102 for each of the at least one account data entry 216 included in the specific user profile 208.

In one embodiment, each account data entry 216 may further include a predetermined period of time (e.g., the custom interval 222), and the method 600 may further include identifying, by the processor 204 of the computing device 110, that the predetermined period of time 222 included in each of the at least one account data entry 216 in the specific user profile 108 has expired. In a further embodiment, the predetermined period of time 222 is set by the related user 102.

Techniques consistent with the present disclosure provide, among other features, systems and methods for automatically sharing randomly generated passwords and generating random passwords at customized intervals. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for randomly generating passwords at customized internals, comprising:
storing, in a profile database of a computing device, a plurality of user profiles, wherein each user profile includes data related to a user including at least
a user identifier;
a master password;
contact information; and
a plurality of account data entries, each account data entry including data related to a user account associated with the related user including at least a current password, one or more password criteria, and a predetermined period of time, wherein the predetermined period of time is set by the related user;
identifying, in the profile database of the computing device, at least one user profile including one or more account data entries where the included predetermined period of time has expired;
generating, by a processor of the computing device, a new password for each of the one or more account data entries included in each of the identified at least one user profile using one or more random password generation algorithms, wherein each generated new password is based on the one or more password criteria included in the respective account data entry;
updating, in the profile database of the computing device, the current password included in each of the one or more account data entries included in each of the identified at least one user profile based on the generated new password;
identifying, by the processor of the computing device, a specific user profile of the identified at least one user profile; and
transmitting, by a transmitter of the computing device, at least an indication of the generated new password for each of the one or more account data entries included in the specific user profile where the included predetermined period of time has expired to the user related to the specific user profile based on the contact information included in the specific user profile.

2. The method of claim 1, further comprising:
transmitting, by a transmitter of the computing device, the generated new password for each of the one or more account data entries included in each of the identified at least one user profile to an application server associated with the respective related user account.

3. The method of claim 1, wherein the one or more password criteria include at least one of: minimum number of characters, maximum number of characters, number of alphanumeric characters, number of symbols, and letter case requirements.

4. The method of claim 1, further comprising:
receiving, by a receiver of the computing device, a password interval update request originating from a specific user, wherein the password interval update request includes at least a specific user identifier associated with the specific user and an updated period of time;
identifying, in the profile database of the computing device, a specific user profile where the included user identifier corresponds to the specific user identifier; and
updating, in the specific user profile, the predetermined period of time based on the updated period of time.

5. A system for randomly generating passwords at customized internals, comprising:
a profile database configured to store a plurality of user profiles, wherein each user profile includes data related to a user including at least
a user identifier,
a master password,
contact information, and
a plurality of account data entries, each account data entry including data related to a user account associated with the related user including at least a current password, one or more password criteria, and a predetermined period of time, wherein the predetermined period of time is set by the related user;
a processing device configured to
identify, in the profile database of the computing device, at least one user profile including one or more account data entries where the included predetermined period of time has expired,
generate a new password for each of the one or more account data entries included in each of the identified at least one user profile using one or more random password generation algorithms, wherein each generated new password is based on the one or more password criteria included in the respective account data entry,
update, in the profile database of the computing device, the current password included in each of the one or more account data entries included in each of the identified at least one user profile based on the generated new password, and
identify a specific user profile of the identified at least one user profile; and
a transmitting device configured to transmit at least an indication of the generated new password for each of the one or more account data entries included in the specific user profile where the included predetermined period of time has expired to the user related to the specific user profile based on the contact information included in the specific user profile.

6. The system of claim 5, further comprising:
a transmitting device configured to transmit the generated new password for each of the one or more account data entries included in each of the identified at least one user profile to an application server associated with the respective related user account.

7. The system of claim 5, wherein the one or more password criteria include at least one of: minimum number of characters, maximum number of characters, number of alphanumeric characters, number of symbols, and letter case requirements.

8. The system of claim 5, further comprising:
a receiving device configured to receive a password interval update request originating from a specific user, wherein the password interval update request includes at least a specific user identifier associated with the specific user and an updated period of time, wherein
the processing device is further configured to
identify, in the profile database of the computing device, a specific user profile where the included user identifier corresponds to the specific user identifier, and
update, in the specific user profile, the predetermined period of time based on the updated period of time.

9. A method for randomly generating passwords at customized internals, comprising:
storing, in a profile database of a computing device, a plurality of user profiles, wherein each user profile includes data related to a user including at least
a user identifier;
a master password; and
a plurality of account data entries, each account data entry including data related to a user account associated with the related user including at least a current password, one or more password criteria, and a predetermined period of time, wherein the predetermined period of time is set by the related user;
identifying, in the profile database of the computing device, at least one user profile including one or more account data entries where the included predetermined period of time has expired;
generating, by a processor of the computing device, a new password for each of the one or more account data entries included in each of the identified at least one user profile using one or more random password generation algorithms, wherein each generated new password is based on the one or more password criteria included in the respective account data entry;
updating, in the profile database of the computing device, the current password included in each of the one or more account data entries included in each of the identified at least one user profile based on the generated new password;
receiving, by a receiver of the computing device, a password interval update request originating from a specific user, wherein the password interval update request includes at least a specific user identifier associated with the specific user and an updated period of time;
identifying, in the profile database of the computing device, a specific user profile where the included user identifier corresponds to the specific user identifier; and
updating, in the specific user profile, the predetermined period of time based on the updated period of time.

10. The method of claim 9, further comprising:
transmitting, by a transmitter of the computing device, the generated new password for each of the one or more account data entries included in each of the identified at least one user profile to an application server associated with the respective related user account.

11. The method of claim 9, wherein the one or more password criteria include at least one of: minimum number of characters, maximum number of characters, number of alphanumeric characters, number of symbols, and letter case requirements.

12. A system for randomly generating passwords at customized internals, comprising:
a profile database configured to store a plurality of user profiles, wherein each user profile includes data related to a user including at least
a user identifier,
a master password, and
a plurality of account data entries, each account data entry including data related to a user account associated with the related user including at least a current password, one or more password criteria, and a predetermined period of time, wherein the predetermined period of time is set by the related user; and
a processing device configured to
identify, in the profile database of the computing device, at least one user profile including one or more account data entries where the included predetermined period of time has expired,
generate a new password for each of the one or more account data entries included in each of the identified at least one user profile using one or more random password generation algorithms, wherein each generated new password is based on the one or more password criteria included in the respective account data entry, and
update, in the profile database of the computing device, the current password included in each of the one or more account data entries included in each of the identified at least one user profile based on the generated new password; and
a receiving device configured to receive a password interval update request originating from a specific user, wherein the password interval update request includes at least a specific user identifier associated with the specific user and an updated period of time, wherein
the processing device is further configured to
identify, in the profile database of the computing device, a specific user profile where the included user identifier corresponds to the specific user identifier, and
update, in the specific user profile, the predetermined period of time based on the updated period of time.

13. The system of claim 12, further comprising:
a transmitting device configured to transmit the generated new password for each of the one or more account data entries included in each of the identified at least one user profile to an application server associated with the respective related user account.

14. The system of claim 12, wherein the one or more password criteria include at least one of: minimum number of characters, maximum number of characters, number of alphanumeric characters, number of symbols, and letter case requirements.

* * * * *